(12) United States Patent
Sharifi Mehr

(10) Patent No.: US 11,509,693 B2
(45) Date of Patent: *Nov. 22, 2022

(54) EVENT-RESTRICTED CREDENTIALS FOR RESOURCE ALLOCATION

(71) Applicant: Amazon Technologies, Inc., Reno, NV (US)

(72) Inventor: Nima Sharifi Mehr, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/832,265

(22) Filed: Mar. 27, 2020

(65) Prior Publication Data

US 2020/0228572 A1 Jul. 16, 2020

Related U.S. Application Data

(62) Division of application No. 15/382,054, filed on Dec. 16, 2016, now Pat. No. 10,609,077.

(51) Int. Cl.
*H04L 29/06* (2006.01)
*H04L 9/40* (2022.01)

(52) U.S. Cl.
CPC ............ *H04L 63/20* (2013.01); *H04L 63/06* (2013.01); *H04L 63/08* (2013.01); *H04L 63/105* (2013.01); *H04L 63/108* (2013.01)

(58) Field of Classification Search
None
See application file for complete search history.

(56) References Cited

U.S. PATENT DOCUMENTS

| 9,762,619 | B1* | 9/2017 | Vaidya | G06F 9/455 |
| 2010/0083355 | A1* | 4/2010 | Brown | H04L 67/306 |
| | | | | 726/5 |
| 2013/0061301 | A1 | 3/2013 | Novak | |
| 2014/0196130 | A1* | 7/2014 | Brooker | H04W 12/0431 |
| | | | | 726/6 |

(Continued)

OTHER PUBLICATIONS

Requirement for Restriction/Election issued in U.S. Appl. No. 15/382,054 dated Oct. 23, 2018.

(Continued)

*Primary Examiner* — Andrew J Steinle
(74) *Attorney, Agent, or Firm* — Hogan Lovells US LLP

(57) ABSTRACT

A customer of a resource allocation service can register a function to be executed using virtual resources, where the function includes customer code to be executed. Customer events are defined as triggers for a registered function, and a resource instance is allocated to execute the registered function when triggering event is detected. An identity role associated with the triggering function is used to obtain access credentials for any data source which a triggering event might require for processing. An event-specific access credential is generated that provides a subset of these access privileges using a template policy for the registered function that is filled with values specific to the triggering event. The filled template policy and base credential are used to generate an event-specific credential valid only for access needed for the event. This event-specific credential can be passed with the event data for processing by an allocated instance.

20 Claims, 6 Drawing Sheets

(56) References Cited

U.S. PATENT DOCUMENTS

2015/0242616 A1    8/2015  Oprea

OTHER PUBLICATIONS

Non-Final Rejection issued in U.S. Appl. No. 15/382,054 dated Mar. 8, 2019.
Final Rejection issued in U.S. Appl. No. 15/382,054 dated Aug. 16, 2019.
Notice of Allowance issued in U.S. Appl. No. 15/382,054 dated Nov. 29, 2019.

* cited by examiner

EVENT-RESTRICTED CREDENTIALS FOR RESOURCE ALLOCATION

CROSS-REFERENCES TO RELATED APPLICATIONS

This application claims the benefit or priority and is a divisional of allowed U.S. application Ser. No. 15/382,054, filed Dec. 16, 2016, entitled "EVENT-RESTRICTED CREDENTIALS FOR RESOURCE ALLOCATION," the disclosure of this application is incorporated by reference in its entirety herein for all intents and purposes.

BACKGROUND

Users are increasingly performing tasks using remote computing resources, which may be offered through a shared-resource environment. This has many advantages, as users do not have to purchase and maintain dedicated hardware and software, and instead can pay for only those resources that are utilized at any given time, where those resources typically will be managed by a resource provider. Users can perform tasks such as storing data or executing applications using various types of resources offered by the resource provider. In some environments resources can be allocated on a task-specific basis. In order to enable the resources to be able to process the relevant tasks, those resources can be provided with access credentials for any data sources that might be required. In many instances only a subset of this access will be relevant for any given task, such that access granted under the credential will provide access to more data than is needed. This can present a security vulnerability in that a compromised resource can have access to other data in the environment.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for the generation of event-specific credentials for use in processing customer events using a set of virtual resources. In various embodiments a customer can register a function to be executed using the virtual resources, where the function includes customer code to be executed. The customer can also define customer events that serve as triggers for a registered function. When a triggering function is detected, a virtual resource instance can be allocated to execute the registered function to process the triggering event. An identity role can be associated with the triggering function, which can be used to obtain access credentials to any data source that a triggering event might require for processing. In order to restrict the sources accessible for a specific event, however, an event-specific access credential or token can be generated that provides a subset of the access privileges of the base credential. A template policy specified for the registered function can be filled with values specific to the triggering function. These values can specify, for example, the sources of data to which to grant access. The filled template policy and base credential can be used to generate an event-specific credential that is valid only for the specific sources for a determined period of time. This event-specific credential can be passed with the event data for processing by an allocated instance. An unintended party coming into possession of the event-specific credential will not be able to gain access to other data sources to which access would otherwise have been granted under the base credential.

Various other functions can be implemented within the various embodiments as well as discussed and suggested elsewhere herein.

Figure 1:
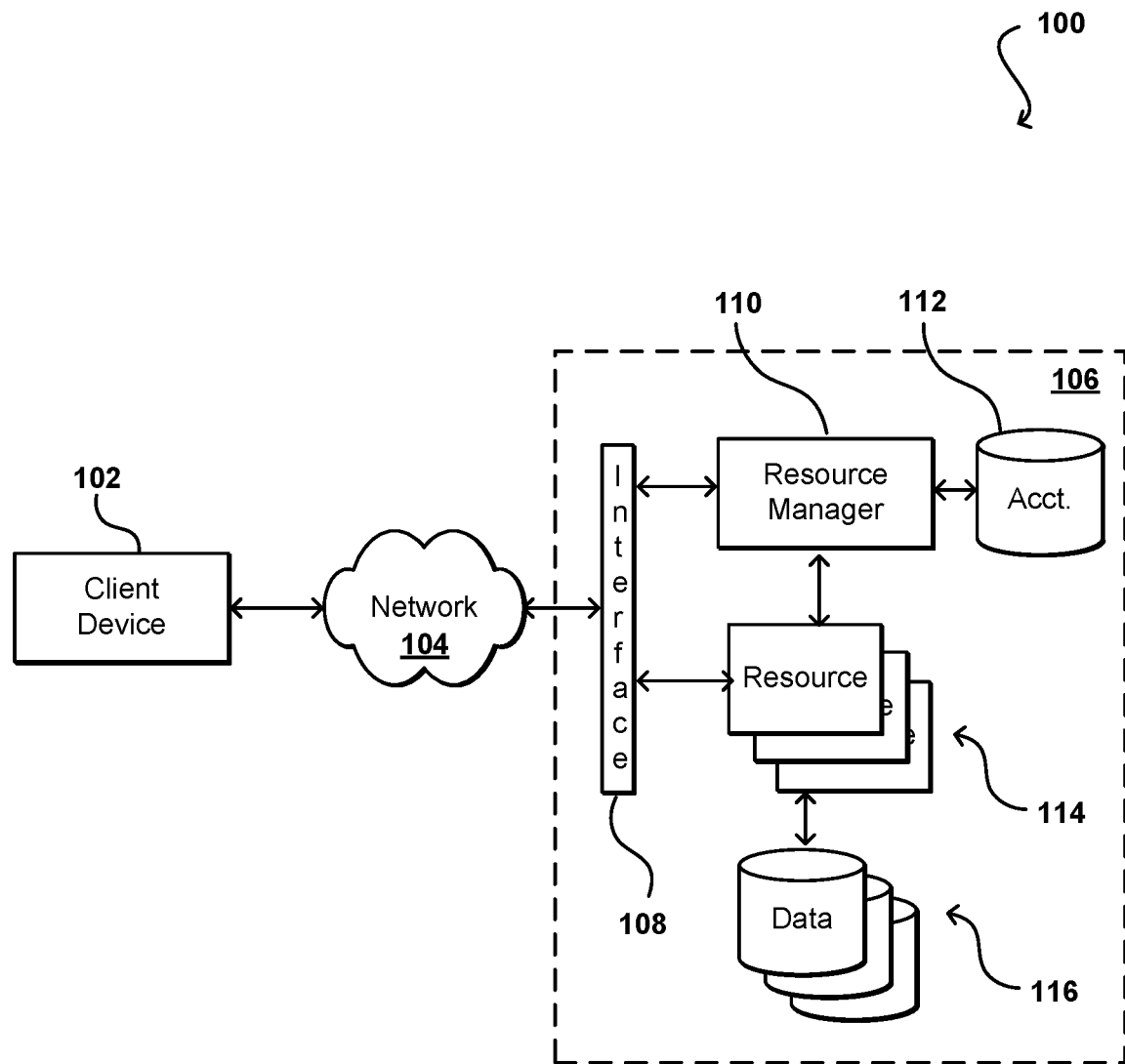
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a multi-tenant resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, such an environment enables organizations to obtain and configure computing resources over a network such as the Internet to perform various types of computing operations (e.g., execute code, including threads, programs, software, routines, subroutines, processes, etc.). Thus, developers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

In many such environments, resource instances such as virtual machines are allocated to a customer (or other authorized user) for a period of time in order to process tasks on behalf of that customer. In many cases, however, a customer may not have a steady flow of work such that the customer must maintain a sufficient number of virtual machines to handle peak periods of work but will often have less than this amount of work. This can result in underutilization and unneeded expense for both the customer and the resource provider. Approaches in accordance with various embodiments can instead allocate resource instances on a task or event basis to execute a function. A resource instance can be allocated to run a function in response to a customer request or event, and once the function has completed that instance can either be made available for processing a different event or destroyed, among other such options. In either case, the customer will not be charged for more processing by the instance than was needed to run the function.

Figure 2:
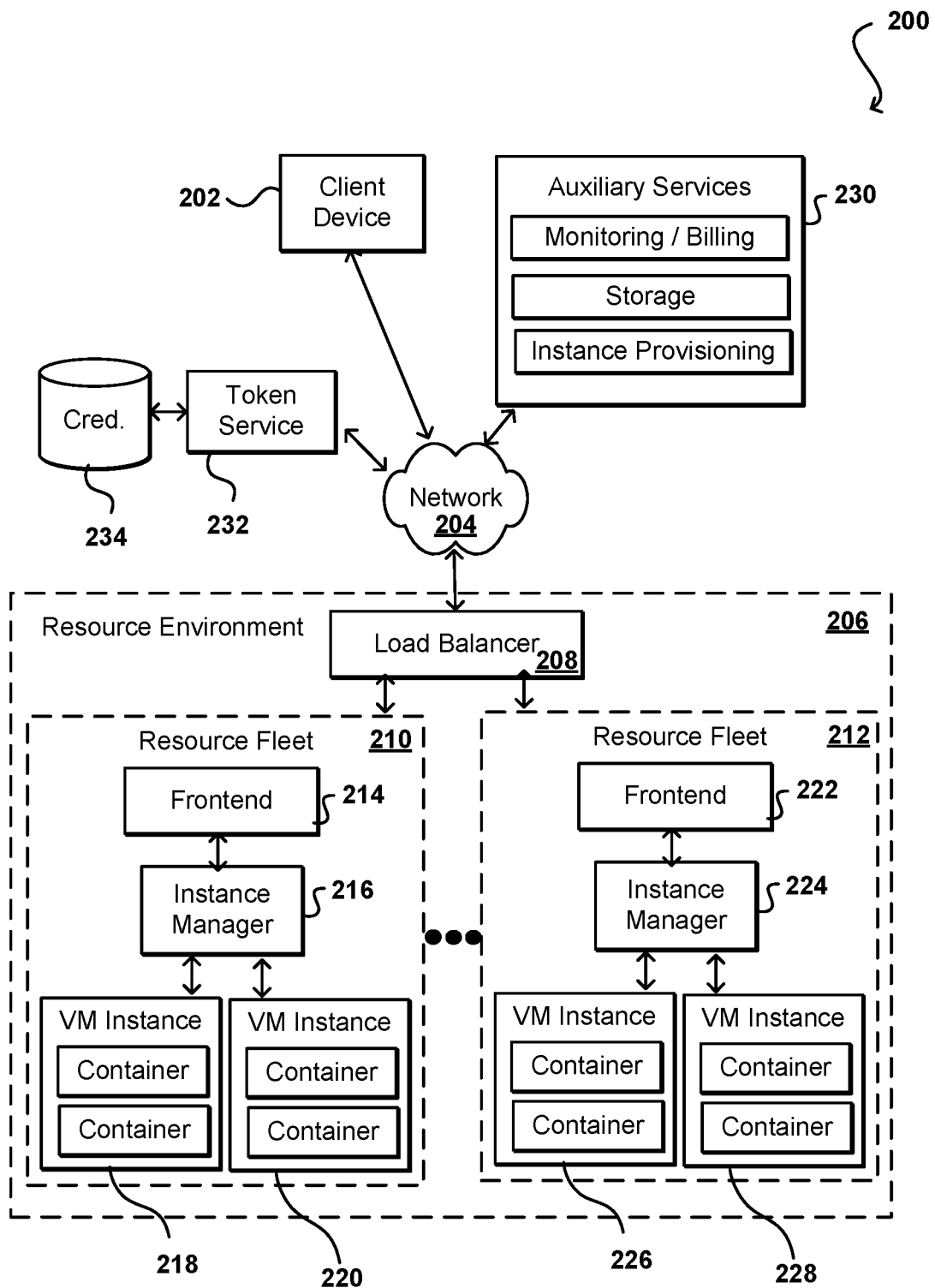
FIG. 2 illustrates an example resource environment for providing task-based resource allocation that can be used in accordance with various embodiments.

FIG. 2 illustrates components of an example environment 200 that can be used to implement such functionality. The functionality can be offered as a service, such as a Web service, in at least some embodiments, wherein a client device 202 associated with a customer can submit requests or event information over at least one network 204 to the resource environment (i.e., a resource provider environment, service provider environment, or other shared resource or multi-tenant environment). The events or requests can each be associated with specific code to be executed in the resource environment. This code can be registered with the system, and will be referred to herein as a registered function, which can be owned by a respective customer or available for use by multiple customers, among other such options. The compute service offered by the resource environment can be referred to as a "serverless" compute service that can allocate virtual resources to execute registered functions in response to customer events and automatically manage the underlying compute resources. The functions can be executed on high-availability compute infrastructure that can perform the administration of the compute resources, including server and operating system maintenance, capacity provisioning and automatic scaling, code and security patch deployment, and code monitoring and logging. Customers supply the code to be executed and can be billed based on the actual amount of compute time utilized on behalf of those customers.

In some embodiments, a registered function can include the customer code as well as associated configuration information. The configuration information can include, for example, the function name and resource requirements. Registered functions can be considered to be "stateless," in that they do not rely on state contained in the infrastructure and considered to be lacking affinity to the underlying infrastructure (e.g., the functions are not installed or otherwise tied to the operating system running in the virtual machine), so that the resource managers can rapidly launch as many copies of the function as is needed to scale to the rate of incoming events. A customer providing the code for a function can specify various configuration parameters, such as the memory, timeout period, and access rules, among other such aspects. The customer in some embodiments can also specify resources that are able to trigger execution of a registered function by a resource instance. These resources can include, for example, data buckets, database tables, or data streams, among other such options. The resource manager can invoke the code only when needed and automatically scale to support the rate of incoming requests without requiring configuration or management on behalf of the customer. A function can be executed by an allocated resource instance within milliseconds of an event in at least some embodiments, and since the service scales automatically the performance will remain consistently high as the frequency of events increases. Further, since the code is stateless the service can initialize as many resource instances as needed without lengthy deployment and configuration delays.

Routing information for customer requests or events to execute on a virtual compute fleet (e.g., a group of virtual machine instances that may be used to service such requests) based on the frequency of execution of the user code enables high frequency user code to achieve high distribution, which can be good for fault tolerance, and enables low frequency user code to achieve high consolidation, which can be good for cost reduction.

An environment such as that described with respect to FIG. 2 can facilitate the handling of requests to execute user code on a virtual compute fleet by utilizing the containers created on the virtual machine instances as compute capacity. Information for a request or event can be received to a load balancer 208 that can determine an appropriate resource fleet 210, 212 to which to direct the information. As will be discussed in more detail later herein, the decision can be based upon various types of information, as may include the context associated with the type of event or request. Upon receiving a request to execute user code on a selected virtual compute fleet 210, 212, a frontend service 214, 222 associated with the virtual compute fleet can provide the information to an instance manager, which can direct the information to a virtual machine (VM) instance 218, 220, 226, 228 where a container on the instance can provide an execution environment for the registered function.

The client device 202 may utilize one or more user interfaces, command-line interfaces (CLIs), application programming interfaces (APIs), and/or other programmatic interfaces for generating and uploading customer code, invoking the customer code (e.g., submitting a request to execute the code on the virtual compute system), scheduling event-based jobs or timed jobs, tracking the customer code, and/or viewing other logging or monitoring information related to their requests and/or customer code. Although one or more embodiments may be described herein as using a user interface, it should be appreciated that such embodiments may, additionally or alternatively, use any CLIs, APIs, or other programmatic interfaces.

In the example of FIG. 2, the resource environment 206 is illustrated as being connected to at least one network 204. In some embodiments, any of the components within the recourse environment can communicate with other components (e.g., client computing devices 202 and auxiliary services 230, which may include monitoring/logging/billing services, storage service, an instance provisioning service, and/or other services that may communicate with components or services of the resource environment 206. In other embodiments, only certain components such as the load balancer 208 and/or the frontends 214, 222 may be connected to the network 204, and other components of the virtual resource service (i.e., components of the resource fleets) may communicate with other components of the resource environment 206 via the load balancer 208 and/or the frontends 214, 222.

Customer may use the resource fleets 210, 212 to execute user code thereon. For example, a customer may wish to run a piece of code in connection with a web or mobile application that the customer has developed. One way of running the code would be to acquire virtual machine instances from service providers who provide infrastructure as a service, configure the virtual machine instances to suit the customer's needs, and use the configured virtual machine instances to run the code. Alternatively, the customer may send the resource service a code execution request. The resource service can handle the acquisition and configuration of compute capacity (e.g., containers, instances, etc., which are described in greater detail below) based on the code execution request, and execute the code using the compute capacity. The allocation may automatically scale up and down based on the volume, thereby relieving the customer from the burden of having to worry about over-utilization (e.g., acquiring too little computing resources and suffering performance issues) or under-utilization (e.g., acquiring more computing resources than necessary to run the codes, and thus overpaying).

In the configuration depicted in FIG. 2, a first resource fleet 210 includes a frontend 214, an instance manager 216 (later referred to herein as a worker manager), and virtual machine instances 218, 220. Similarly, other resource fleets 212 can also include a frontend 222, an instance manager 224, and virtual machine instances 226, 228, and there can be any appropriate number of resource fleets and any appropriate number of instances in each resource fleet. The environment can include low and high frequency fleets as well in at least some embodiments, as may serve different types of requests or requests for different types of customers. The fleets can also include any number of worker managers, and in some embodiments the frontend and the worker manager can be resident on a single virtual machine instance.

In some embodiments, the load balancer 208 serves as a front door to all the other services provided by the virtual compute system. The load balancer 208 processes requests to execute user code on the virtual compute system and handles the first level of load balancing across the frontends 214, 222. For example, the load balancer 208 may distribute the requests among the frontends 214, 222 (e.g., based on the individual capacity of the frontends). The requests can be distributed evenly across the frontends or distributed based on the available capacity on the respective fleets, among other such options.

Customer code as used herein may refer to any program code (e.g., a program, routine, subroutine, thread, etc.) written in a program language. Such customer code may be executed to achieve a specific task, for example, in connection with a particular web application or mobile application developed by the user. For example, the customer code may be written in JavaScript (node.js), Java, Python, and/or Ruby. The request may include the customer code (or the location thereof) and one or more arguments to be used for executing the customer code. For example, the customer may provide the customer code along with the request to execute the customer code. In another example, the request may identify a previously uploaded program code (e.g., using the API for uploading the code) by its name or its unique ID. In yet another example, the code may be included in the request as well as uploaded in a separate location (e.g., the external storage service or a storage system internal to the resource environment 206) prior to the request is received by the load balancer 208. The virtual compute system may vary its code execution strategy based on where the code is available at the time the request is processed.

In some embodiments, the frontend 214 for a fleet can determine that the requests are properly authorized. For example, the frontend 214 may determine whether the user associated with the request is authorized to access the customer code specified in the request. The frontend 214 may receive the request to execute such customer code in response to Hypertext Transfer Protocol Secure (HTTPS) requests from a customer, or user associated with that customer. Also, any information (e.g., headers and parameters) included in the HTTPS request may also be processed and utilized when executing the customer code. As discussed above, any other protocols, including, for example, HTTP, MQTT, and CoAP, may be used to transfer the message containing the code execution request to the frontend 214. The frontend 214 may also receive the request to execute such customer code when an event is detected, such as an event that the customer has registered to trigger automatic request generation. For example, the customer may have registered the customer code with an auxiliary service 230 and specified that whenever a particular event occurs (e.g., a new file is uploaded), the request to execute the customer code is sent to the frontend 214. Alternatively, the customer may have registered a timed job (e.g., execute the user code every 24 hours). In such an example, when the scheduled time arrives for the timed job, the request to execute the customer code may be sent to the frontend 214. In yet another example, the frontend 214 may have a queue of incoming code execution requests, and when the batch job for a customer is removed from the virtual compute system's work queue, the frontend 214 may process the customer request. In yet another example, the request may originate from another component within the resource environment 206 or other servers or services not illustrated in FIG. 2.

A customer request may specify one or more third-party libraries (including native libraries) to be used along with the customer code. In one embodiment, the customer request is a ZIP file containing the customer code and any libraries (and/or identifications of storage locations thereof) that are to be used in connection with executing the customer code. In some embodiments, the customer request includes metadata that indicates the program code to be executed, the language in which the program code is written, the customer associated with the request, and/or the computing resources (e.g., memory, etc.) to be reserved for executing the program code. For example, the program code may be provided with the request, previously uploaded by the customer, provided by the virtual compute system (e.g., standard routines), and/or provided by third parties. In some embodiments, such resource-level constraints (e.g., how much memory is to be allocated for executing a particular user code) are specified for the particular customer code, and may not vary over each execution of the customer code. In such cases, the virtual compute system may have access to such resource-level constraints before each individual request is received, and the individual requests may not specify such resource-level constraints. In some embodiments, the customer request may specify other constraints such as permission data that indicates what kind of permissions that the request has to execute the user code. Such permission data may be used by the virtual compute system to access private resources (e.g., on a private network).

In some embodiments, the customer request may specify the behavior that should be adopted for handling the customer request. In such embodiments, the customer request may include an indicator for enabling one or more execution modes in which the customer code associated with the customer request is to be executed. For example, the request may include a flag or a header for indicating whether the customer code should be executed in a debug mode in which the debugging and/or logging output that may be generated in connection with the execution of the customer code is provided back to the customer (e.g., via a console user interface). In such an example, the virtual compute system 110 may inspect the request and look for the flag or the header, and if it is present, the virtual compute system may modify the behavior (e.g., logging facilities) of the container in which the customer code is executed, and cause the output data to be provided back to the customer. In some embodiments, the behavior/mode indicators are added to the request by the user interface provided to the customer by the virtual compute system. Other features such as source code profiling, remote debugging, etc. may also be enabled or disabled based on the indication provided in the request.

The frontend 214 can receive requests to execute customer code on the virtual compute system that have been processed by the load balancer 208. The frontend 214 can request the instance manager 216 associated with the frontend 214 of the particular fleet 210 to find compute capacity in one of the virtual machine instances 218, 220 managed by the instance manager 216. The frontend 214 may include a usage data manager for determining the usage status (e.g., indicating how frequently the user code is executed) of a particular customer code, and a customer code execution manager for facilitating the execution of customer code on one of the virtual machine instances managed by the worker manager. The instance manager 216 manages the virtual machine instances in the respective fleet. After a request has been successfully processed by the load balancer 208 and the frontend 214, the instance manager 216 finds capacity to service the request to execute customer code on the virtual compute system. For example, if there exists a container on a particular virtual machine instance that has the user code loaded thereon, the instance manager 216 may assign the container to the request and cause the request to be executed in the container. Alternatively, if the customer code is available in the local cache of one of the virtual machine instances, the instance manager 216 may create a new container on such an instance, assign the container to the request, and cause the customer code to be loaded and executed in the container. Otherwise, the instance manager 216 may assign a new virtual machine instance to the customer associated with the request from the pool of pre-initialized and pre-configured virtual machine instances, download the customer code onto a container created on the virtual machine instance, and cause the customer code to be executed in the container.

In some embodiments, the virtual compute system is adapted to begin execution of the customer code shortly after it is received (e.g., by the load balancer 208 or frontend 214). A time period can be determined as the difference in time between initiating execution of the customer code (e.g., in a container on a virtual machine instance associated with the customer) and receiving a request to execute the customer code (e.g., received by a frontend). The virtual compute system can be adapted to begin execution of the customer code within a time period that is less than a predetermined duration. The customer code may be downloaded from an auxiliary service 230. The data may comprise user code uploaded by one or more customers, metadata associated with such customer code, or any other data utilized by the virtual compute system to perform one or more techniques described herein. Although only the storage service is illustrated in the example of FIG. 2, the resource environment 206 may include other levels of storage systems from which the customer code may be downloaded. For example, each instance may have one or more storage systems either physically (e.g., a local storage resident on the physical computing system on which the instance is running) or logically (e.g., a network-attached storage system in network communication with the instance and provided within or outside of the virtual compute system) associated with the instance on which the container is created. Alternatively, the code may be downloaded from a web-based data store provided by the storage service.

In some embodiments, once a virtual machine instance has been assigned to a particular customer, the same virtual machine instance cannot be used to service requests of any other customer. This provides security benefits to customers by preventing possible co-mingling of user resources. Alternatively, in some embodiments, multiple containers belonging to different customers (or assigned to requests associated with different customers) may co-exist on a single virtual machine instance. Such an approach may improve utilization of the available compute capacity. Although the virtual machine instances are described here as being assigned to a particular customer, in some embodiments the instances may be assigned to a group of customers, such that an instance is tied to the group of customers and any member of the group can utilize resources on the instance. For example, the customers in the same group may belong to the same security group (e.g., based on their security credentials) such that executing one member's code in a container on a particular instance after another member's code has been executed in another container on the same instance does not pose security risks. Similarly, the instance manager 216 may assign the instances and the containers according to one or more policies that dictate which requests can be executed in which containers and which instances can be assigned to which customers. An example policy may specify that instances are assigned to collections of customers who share the same account (e.g., account for accessing the services provided by the virtual compute system). In some embodiments, the requests associated with the same customer group may share the same containers (e.g., if the customer code associated therewith are identical). In some embodiments, a request does not differentiate between the different customers of the group and simply indicates the group to which the customers associated with the requests belong. In some embodiments, the virtual compute system may maintain a separate cache in which customer code is stored to serve as an intermediate level of caching system between the local cache of the virtual machine instances and a web-based network storage (e.g., accessible via the network 140).

The instance manager 216 may also manage creation, preparation, and configuration of containers within virtual machine instances. Containers can be logical units within a virtual machine instance and utilize resources of the virtual machine instances to execute customer code. Based on configuration information associated with a request to execute customer code, such a container manager can create containers inside a virtual machine instance. In one embodiment, such containers are implemented as Linux containers.

After the customer code has been executed, the instance manager 216 may tear down the container used to execute the user code to free up the resources it occupied to be used for other containers in the instance. Alternatively, the instance manager 216 may keep the container running to use it to service additional requests from the same customer. For example, if another request associated with the same customer code that has already been loaded in the container, the request can be assigned to the same container, thereby eliminating the delay associated with creating a new container and loading the customer code in the container. In some embodiments, the instance manager 216 may tear down the instance in which the container used to execute the customer code was created. Alternatively, the instance manager 216 may keep the instance running to use the instance to service additional requests from the same customer. The determination of whether to keep the container and/or the instance running after the user code is done executing may be based on a threshold time, the type of the user, average request volume of the user, and/or other operating conditions.

In some embodiments, the virtual compute system may provide data to one or more of the auxiliary services 230 as the system services incoming code execution requests. For example, the virtual compute system may communicate with the monitoring/logging/billing services, which may include: a monitoring service for managing monitoring information received from the virtual compute system, such as statuses of containers and instances on the virtual compute system; a logging service for managing logging information received from the virtual compute system, such as activities performed by containers and instances on the virtual compute system; and a billing service for generating billing information associated with executing customer code on the virtual compute system (e.g., based on the monitoring information and/or the logging information managed by the monitoring service and the logging service). In addition to the system-level activities that may be performed by the monitoring/logging/billing services (e.g., on behalf of the virtual compute system) as described above, the monitoring/logging/billing services may provide application-level services on behalf of the customer code executed on the virtual compute system. For example, the monitoring/logging/billing services may monitor and/or log various inputs, outputs, or other data and parameters on behalf of the customer code being executed on the virtual compute system. Although shown as a single block, the monitoring, logging, and billing services may be provided as separate services.

In some embodiments, the instance manager 216 may perform health checks on the instances and containers managed by the instance manager (e.g., an "active pool" of virtual machine instances managed by the instance manager and currently assigned to one or more customers). For example, the health checks performed by the instance manager 216 may include determining whether the instances and the containers managed by the instance manager have any issues of (1) misconfigured networking and/or startup configuration, (2) exhausted memory, (3) corrupted file system, (4) incompatible kernel, and/or any other problems that may impair the performance of the instances and the containers. In one embodiment, the instance manager 216 performs the health checks periodically. In some embodiments, the frequency of the health checks may be adjusted automatically based on the result of the health checks. In other embodiments, the frequency of the health checks may be adjusted based on customer requests. In some embodiments, the instance manager 216 may perform similar health checks on the instances and/or containers in the pool of pre-warmed virtual machine instances that are not yet assigned to any customer but ready to service incoming requests. The instances and/or the containers in such a warming pool may be managed either together with those instances and containers in the active pool or separately. In some embodiments, in the case where the health of the instances and/or the containers in the warming pool is managed separately from the active pool, a separate warming pool manager that manages the warming pool may perform the health checks described above on the instances and/or the containers in the warming pool.

The virtual machine instances can be logical in nature and implemented by a single or multiple physical computing devices. At least some of the virtual machine instances may be provisioned to provide a variety of different desired conditions depending on the needs of the user. Examples of the types of desired conditions include, but are not limited to: particular operating systems, particular language runtimes, and particular libraries that may be utilized by the user code. Additionally, one or more virtual machine instances may be provisioned generically when a desired operating condition is not specified or is otherwise not available. One skilled in the relevant art will appreciate that the virtual compute system is logical in nature and can encompass physical computing devices from various geographic regions.

The frontend 214, 222 can route code-processing requests according to a method that is different than the method used by the load balancer 208 to route requests among the frontends. For example, a frontend 214 can route the requests to the specific instance manager based on the customer code and/or based on the customer associated with the customer code. In some embodiments, the routing is determined based on a consistent-hashing scheme in which one or more parameters associated with the request (e.g., customer ID, customer code ID, etc.) are hashed according to a hash function and the request is sent to one of the instance managers that has previously been assigned to the sections of a hash ring (e.g., containing a plurality of hash values) that corresponds to the resulting hash value. For example, the instance managers can occupy one or more sections of the hash ring, and the requests can be mapped to those same hash values. In some embodiments, the hash values may be integer values, and each instance manager may be associated with one or more integer values. The one or more integer values associated with a particular instance manager may be determined based on one or more parameters associated with the instance manager (e.g., IP address, instance ID, etc.). In some embodiments, the request may be sent to the instance manager whose associated integer values are closest to, but not larger than, the hash value calculated for that request (e.g., using modulo arithmetic).

When the frontends determine that one or more instance managers have become unavailable, the frontends can associate the hash values previously associated with the one or more instance managers that have become unavailable with one or more available instance managers in another fleet. Similarly, when a new instance manager is added to a fleet, the new instance manager may take a share of the hash values associated with the existing instance managers. For example, the new instance manager may be assigned one or more sections of the hash ring that were previously assigned to the existing instance managers.

As mentioned, resource capacity can be allocated as needed to execute code or perform specific tasks, which can be allocated in response to various events. The events can include any appropriate types of events, as may be permitted by a service provider or allowed through various rules or policies, among other such options. These can include, for example, modifications to data buckets or updates to data tables, among other such options. The dynamic allocation of such capacity enables service owners to get out of the business of provisioning and managing the underlying hardware for executing code. For flexibility and efficiency in resource management, such a platform or service might not make any guarantees with respect to reusing the same containers or resource instances for running a specific instance of code, such as a registered function, for all incoming requests.

As mentioned, in order to process various types of events a resource instance for a registered function may require access to various other resources, data sources, or other relevant systems or functionality in (or outside) a resource allocation environment. In some embodiments, a function can be configured with a specified role or identity, which will have various associated permissions and privileges. A registered function can be associated with a determined role, and when a resource instance is allocated for the registered function, the resource instance can be provided with an access token, or other appropriate security credential, which can provide the access needed for that function. As illustrated in the example 200 of FIG. 2, the token can be provided by a token service 232, which can be internal or external to the resource environment 206, and may managed by the resource provider or a third party in various embodiments. The token service can store information about various types of roles and access in a credential repository 234, or other appropriate location, and in response to a request for an access token for a registered function, can determine the appropriate role and permissions and provide a corresponding access token to be provided to the allocated resource instance. The frontend 214 or instance manager 216 for a relevant resource fleet 210 can cause the configured role to be bound to the relevant host(s) when an instance of a registered function is created on that host. The role can be bound as an instance profile or other such mechanism. Once the role is bound, the resource instance can assume the bound identity for accessing various resources or dependencies, as may include various data sources, internal or external resource, or network functionality, among other such options. The resource instance can thus obtain the temporary credentials needed to execute the registered function and process the event.

Using such an identity management model, the function instances triggered by any event could thus have access to credentials with the same privileges. For example, a registered function can have input access to a specified data bucket specified in the triggering event and write access to a corresponding database table. The assigned identity role for this function could then allow any function instance to read from any available bucket from that data source and write into any available table in the relevant database. A vulnerability present in the registered lambda function (i.e., an extensible markup language (XML) external entity resolution) could allow a producer of an event to hijack the credentials for the registered function, such as by using an XML external entity attack and retrieving the credentials from a local metadata endpoint for the data source. The security breach might then spread across the buckets of all function owners as well as all available tables in the database.

Accordingly, approaches in accordance with various embodiments attempt to enhance security and limit the impact of any vulnerabilities by creating and delivering temporary credentials for each event, or type of event, that can act as a trigger for a registered function. While the registered function might be associated with a role having a broader set of permissions, the temporary credentials derived therefrom can have privileges restricted to those required to process the triggering event. A function owner can define one or more parameterized access policies for his or her registered function(s) that can be based at least in part upon the types of triggering events for that registered function. The resource allocation service can use these parameterized access policies to generate policy instances corresponding to each event, and use the policy instances for creating and delivering the temporary credentials with each event.

Figure 3:
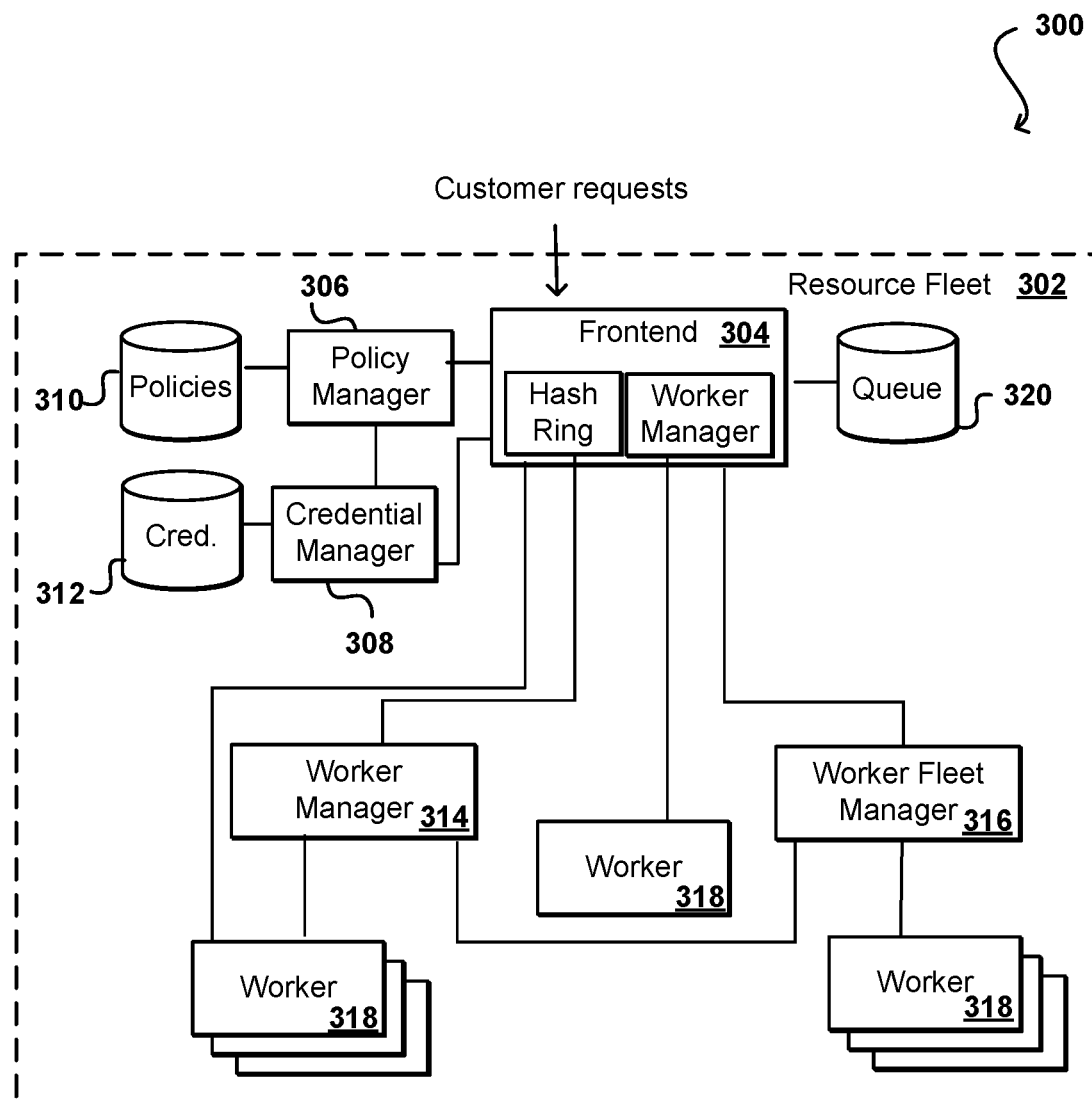
FIG. 3 illustrates an example resource fleet that can be utilized in accordance with various embodiments.

FIG. 3 illustrates an example environment 300 that can be used to implement at least some of this functionality. In this example, information for customer requests or events can be directed to a resource fleet 302. The information can be directed using a load balancer and/or interface layer as discussed previously as part of a resource allocation environment. In this example the resource instances will be referred to as "workers," which in various embodiments can refer to the virtual machine instances 218, 220, 226, 228 described with respect to FIG. 2. It should be understood, however, that various other types of resource instances can be utilized as workers as well within the scope of the various embodiments.

As described, the frontend 304 may receive an event notification, customer request, or other event information that indicates an event has occurred for which a registered function should be utilized or processing. In this example, the frontend 304 can determine the appropriate registered function and place the event information in an event queue 320. In other embodiments the event information might be placed into the event queue before determining the registered function, or the event information might specify the registered function, among other such options. Further, in this event the frontend 304 and/or a worker manager of the frontend can place the event information in the event queue 320, while in other embodiments other worker managers 314, 316 might receive the information and place the information in the same, or a different queue, among other such options. The frontend, worker manager, or a separate queue manager can determine that a worker 318 is now available to process the event information using the respective registered function. This can include, for example, determining that a new instance should be initialized to process the event as well as allocating an existing instance, etc. The respective worker manager 314 can then allocate the relevant worker 318 for the event, pull the event information from the event queue 320, and provide the information to the allocated worker 318 for processing using the registered function.

At some subsequent point, the allocated worker 314 will complete processing for the event. This can occur for a number of different reasons as discussed elsewhere herein. The allocated instance can return a result of the processing that can be received back to the worker manager 314 and/or the frontend 304. In some embodiments the result will go to the worker manager, so the manager knows the instance is available for processing another event, and then can go to the frontend, so the frontend can provide any appropriate response or take another appropriate action.

In order to process the event, a worker 318 will have to be allocated for the relevant registered function. As mentioned, the worker will need to obtain the appropriate access credential(s) for the registered function, as may be determined by a role bound to that instance for the registered function. As mentioned, the role can provide various types of access for a determined period of time, such as fifteen minutes in some embodiments, although other lengths of time can be specified as well. Since there can be various types of triggering events for a function, the role can enable access to all relevant data for any of those events for the entire lifecycle of the function. As mentioned, however, granting all the access provided under the role can enable any vulnerability in the registered function to access data outside the scope of the registered function, and potentially exfiltrate the credentials outside of the function for various other purposes. As an example, various parsers might be used to ingest and process different types of documents, and without a security review of those parsers there is potential that parsing of an untrusted document could expose access to the function credentials.

Accordingly, approaches in accordance with various embodiments can provide event-specific credentials that are derived from an identity role bound, or otherwise associated, to the registered function for a resource instance. The necessary privileges can be provided under the role, but the restricted credentials can prevent access outside that needed to process the event. A system, component, or service such as a credential manager 308 can create a temporary token that has access only to those input and output sources required for processing the event, and can cause that token to be passed to the relevant worker 318 allocated for the event. The event-specific credential can be bound to the resource instance allocated in response to a specific event, and the permissions granted under the temporary credential determined based upon the specific event. The credential manager 308 can generate a temporary token that is event-specific, and can cause that temporary token to also be stored to a credential repository 312 or other appropriate cache such that the credentials can be passed to any other resource instance allocated for a registered function in response to the same type of event.

The event-specific credential can be generated according to the security token bound to the registered function and received from the token service in at least some embodiments. In order to determine which subset of permissions to be granted from the token, a function owner can define one or more relevant access policies that can be stored to a relevant policy data store 310 or other accessible location. A policy manager 306, or other such system or service, can work with the credential manager 308 to determine the appropriate policy for an event, which the credential manager 308 can then use to determine the appropriate permissions and generate the temporary credential to be provided to the allocated worker 318. The policy manager in some embodiments can maintain a mapping between the policies and events, in order to derive the appropriate temporary credentials from the function role. It should be understood that in at least some embodiments the policy manager 306 and/or credential manager 308 could be implemented in the frontend 304, an event router, or another such component discussed or suggested herein.

In at least some embodiments a function owner can provide a template policy which includes variables whose values will be specific to an event. This can include, for example, identifiers for the input and output data sources to which access can be granted, as well as the type of access and other such information. For each event, the available access for the relevant role can be determined, and the variable values for the event inserted into the template policy. The policy manager can then ensure that the permissions per the policy are contained within the overall permissions of the role, and if so can generate the temporary credential to be provided to the allocated worker. In some embodiments the credential manager can generate the event-specific credentials, while in other embodiments the credential manager can submit a request to the token service to receive an event-specific token, among other such options. As mentioned, the credential manager 308 can cache a received event-specific token in a local credential cache 312 to be used for other similar events for the registered function over the lifetime of the temporary credential.

In some embodiments the frontend 304 or worker manager 314 will perform a lookup to determine the relevant role for a function before performing the worker allocation. The frontend or worker manager can also, directly or via a policy manager 306, determine the appropriate template policy mapped to the specific event. The frontend or worker manager can then, directly or via the credential manager, begin filling in the template using the event-specific values. As an example, a registered function might be triggered by a notification event on a storage service, and the event can be received from any bucket on that storage service. The output could then be written to a database table named: $(bucket-name)-db. An example, conventional access policy for such a function is given by:

```
{
    "Statement": [
        {
            "Action": [
                "db1:GetObject"
            ],
            "Effect": "Allow",
            "Resource": "*"
        },
        {
            "Action": [
                "db2:UpdateItem"
            ],
            "Effect": "Allow",
            "Resource": "*"
        }
    ]
}
```

With the proposed instance, the function can define the following parameterized access policy for its function:

```
{
    "Statement": [
        {
            "Action": [
                "db1:GetObject"
            ],
            "Effect": "Allow",
            "Resource": "$(event.bucket.arn)/$(event.object.key)"
        },
        {
            "Action": [
                "db2:UpdateItem"
            ],
            "Effect": "Allow",
            "Resource": " arn:db2:us-east-1:12345:table/$(event.bucket.arn)-db"
        }
    ]
}
```

Having this parameterized access policy, if the resource allocation service is delivering a notification event on bucket of: test-data and S3 object of: sample-001, then the service can use an access policy such as the following for generating the events associated temporary credentials:

```
{
    "Statement": [
        {
            "Action": [
                "db1:GetObject"
            ],
            "Effect": "Allow",
            "Resource": arn:db1:::test-data/sample-001"
        },
        {
            "Action": [
                "db2:UpdateItem"
            ],
            "Effect": "Allow",
            "Resource": "arn:db2:us-east-1:12345:table/test-data-db"
        }
    ]
}
```

As illustrated, the respective values can be filled into the policy template with the specific buckets, tables, or other sources specified in the policy. The policy can then be instantiated into a specific string, such that the policy does not have any value to other parties. The variables in the template policy are thus filled with the respective values from the triggering event. The event-specific policy can then be processed with the base credential received for the role to obtain a second token that has restricted privileges, from the base credentials, specific to the triggering event. The event and the temporary event-specific token can then be passed along to the allocated worker. If any of the credentials are leaked or otherwise obtained by an unintended third party, the credentials would only provide access to the specific input and output sources for the event. The event-specific credentials can also have a shorter period of time in some embodiments, such as on the order of a couple of minutes at most, which can be much shorter than the lifetime of the base credentials for the role. This can include, for example, periods that start right away but end before the valid lifetime of the base credential ends, or can include a specified period of time in the future corresponding to a predicted execution time of the registered function for the event, among other such options.

Figure 4:
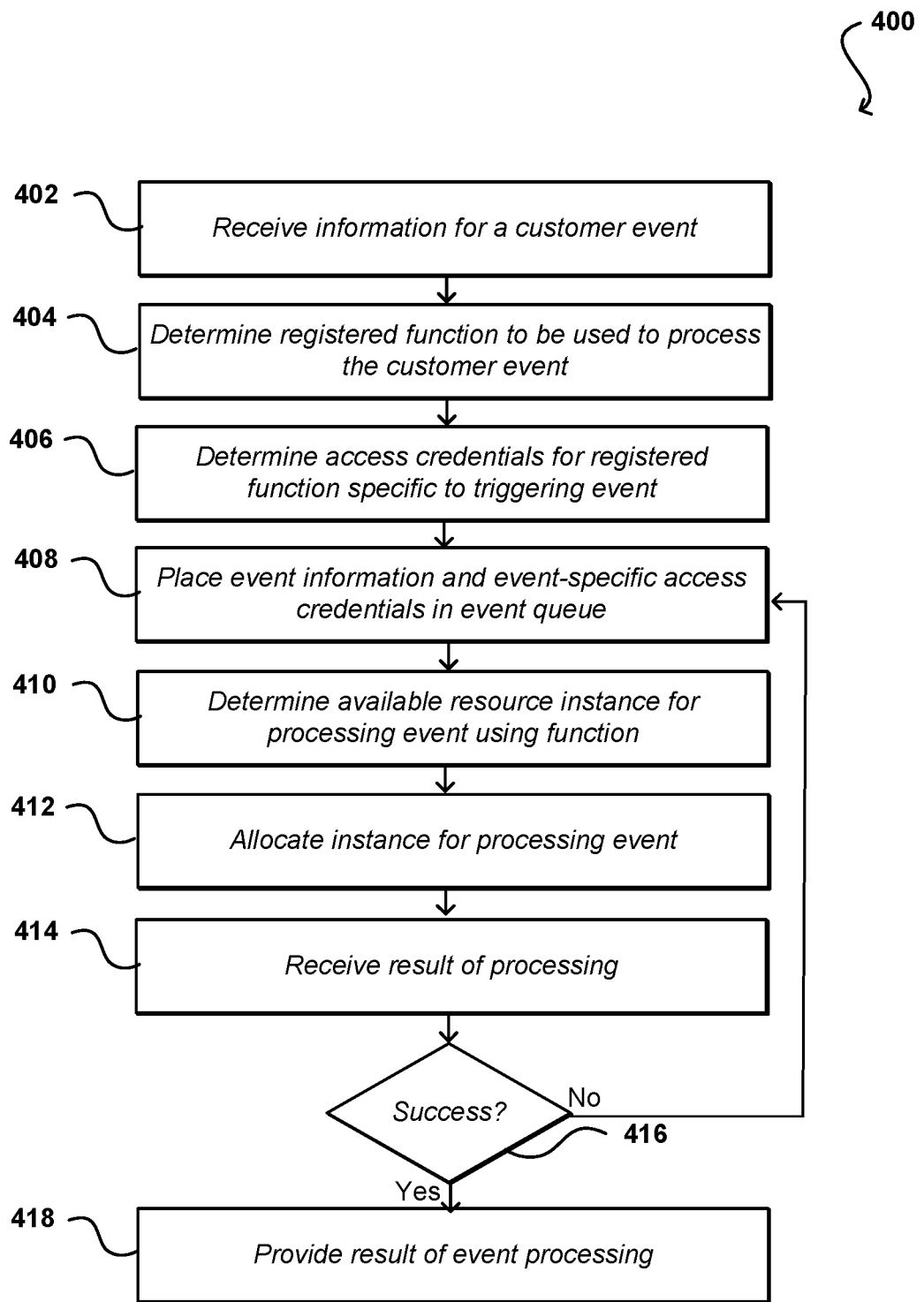
FIG. 4 illustrates an example process for allocating resources for registered functions that can be utilized in accordance with various embodiments.

FIG. 4 illustrates an example process 400 for processing a registered function for an event using one or more allocated resource instances that can be utilized in accordance with various embodiments. It should be understood for this and other processes discussed herein that there can be additional, alternative, or fewer steps performed in similar or alternative orders, or in parallel, within the scope of the various embodiments unless otherwise stated. In this example, information for a triggering customer event is received 402 to a resource allocation service or other appropriate system or offering. The information can be received from a customer request or in response to detecting a specified type of event among other such options. A registered function associated with that type of event that is to be used to process the event can be determined 404. A customer can specify types of functions for types of events, can provide guidelines as to which functions to use, or can specify sources or other criteria for use in determining the appropriate registered function in accordance with various embodiments. As mentioned, access credentials for the registered function that are specific to the event can be determined 406 (i.e., generated or located from cache) as well. This can include, for example, providing a base access token and an event-specific policy to a token service configured to provide at least one restricted access credential that is specific to the event.

In this example, the event information and the event-specific access credentials can be placed 408 into an event queue for processing, although in other embodiments the information may be provided directly to an allocated resource instance, among other such options. Information for the corresponding registered function can be included with the event information or associated with the event information in some way, such that an appropriate resource instance or worker can be selected to process the event. This can include a warmed instance that is already configured and available to process that type of event using the corresponding function, or can involve initializing or reconfiguring a new instance, among other such options. The events can be processed from the queue in any appropriate order, such as by using a FIFO or LIFO approach or selecting based on priority or type, among other such options. At some point it can be determined 410 that there is an available resource instance (e.g., virtual machine or container) for processing the event information using the registered function. The instance can then be allocated 412 for processing the event, and the event can be processed until processing by that instance has completed and a result of the processing is received 412.

When processing by the allocated resource instance has completed, a result of the processing can be received 414. Processing may have completed when the registered function has been successfully executed and the event processed, or may have completed due to a bug in execution or timeout value being reached, among other such options. A determination can be made 416 as to whether the processing was successfully completed. If not, the event data and event-specific access credentials (if still valid) can be placed back in the event queue to re-attempt processing. If the processing is determined to have been successfully completed, then the result of the event processing can be provided 418 to the appropriate destination, such as a device associated with a customer or a result data store, among other such options.

Figure 5:
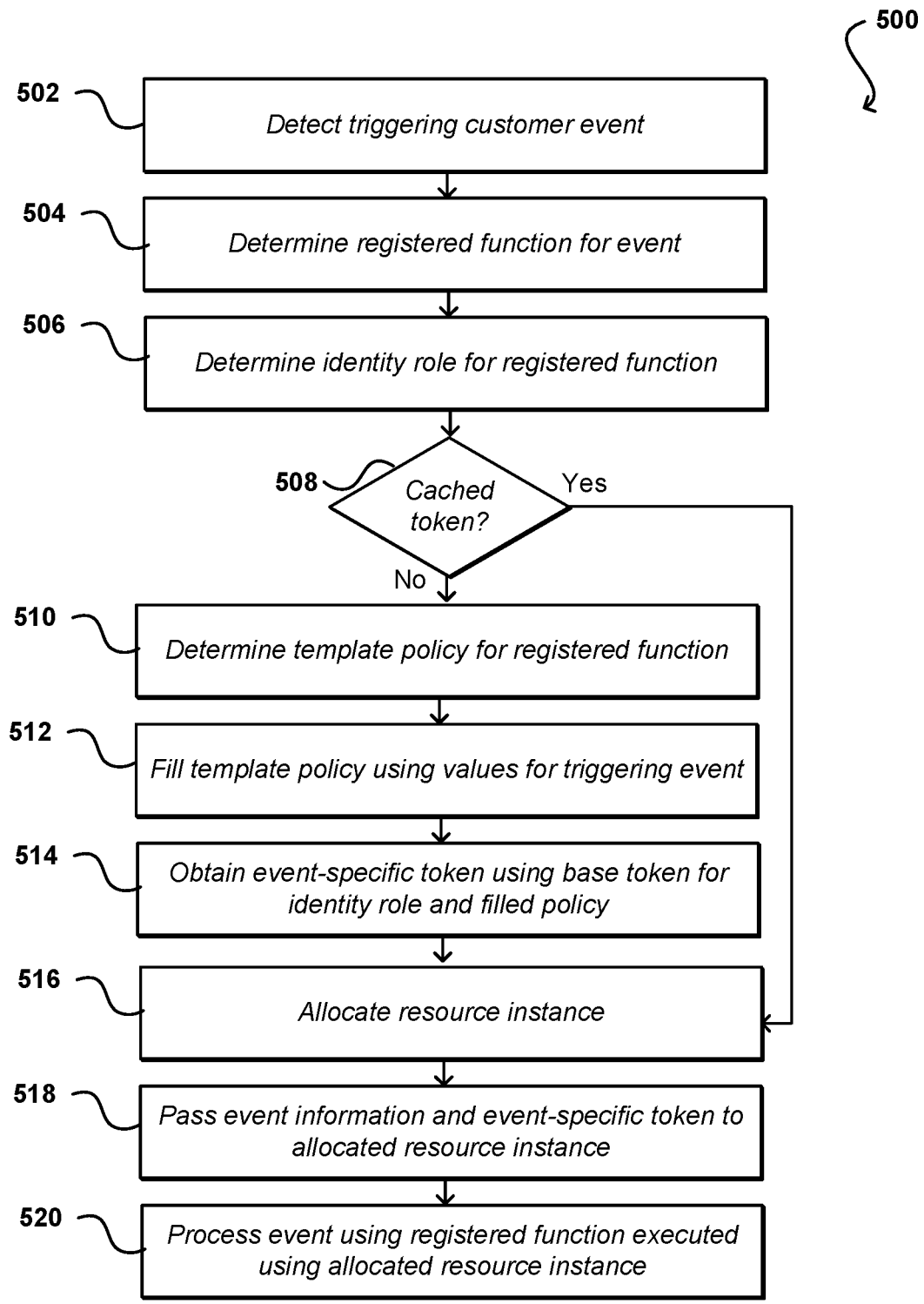
FIG. 5 illustrates an example process for generating event-specific credentials for a registered function that can be utilized in accordance with various embodiments.

FIG. 5 illustrates another example process 500 for determining at least one event-specific access credential that can be utilized in accordance with various embodiments. In this example, a triggering customer event is detected 502 as discussed previously. The registered function associated with the customer event can also be determined 504. An identity role bound to the registered function can be determined 506. Based at least in part upon the identity role and the event information, a determination can be made 508 as to whether a cached token exists that is still valid and is specific to the triggering event, or type of event, that was detected. If so, that cached token can be passed to the allocated resource instance as discussed later herein. If such a token is not cached, or otherwise available, then a template policy for the registered function can be determined 510. As mentioned, there may be one or more template policies defined for a registered function, and the appropriate template policy might depend at least in part upon the type of event triggering the allocation. The determined template policy can have its variables filled 512 using information specific to the triggering event, as may relate to the input and output data sources, types of network functionality and access (e.g., read/write access or use of a secure channel), applicable network security groups, and other aspects discussed and suggested elsewhere herein. In addition to limiting the types of resources to which the function will have access, an event-specific token can limit the environment in which the function executes, as well as the security settings and network configuration applied, among other such options. The event-specific token can be obtained 514, or generated, using the event-specific policy and the base credential for the identity role of the registered function. An appropriate resource instance (or worker) can be allocated 516, such as by generating a new resource instance or allocating use of an existing instance for processing the event. The event-specific token, generated using the event-specific policy, can be passed 518 to the allocated instance with the event information for processing. This can include transmitting the event-specific token to the instance during the allocation process. In some embodiments, the token can instead be pulled from an event queue or data store where the token has been temporarily stored, or can be otherwise be retrieved or obtained using an address or identifier associated with the event. As mentioned, in at least some embodiments the variables in the template policy are filled with values from the triggering event. The event-specific policy can then be processed with the base credential received for the role to obtain an event-specific token that has restricted privileges, from the base credentials, specific to the triggering event. The event and the temporary event-specific token can then be passed along to the allocated instance. The event can then be processed 520 by executing the registered function on the resource instance using data obtained using the event-specific token and then, as appropriate, writing data to a location accessible using the event-specific token. The event token if generated can also be stored to the token cache for use for subsequent events occurring over the valid lifetime of the token.

In some embodiments the values for the template policies can be defined by objects or sources other than the event data. For example, a script (e.g., Python or Ruby) could be executed that would define the values, or generate an entire event-specific policy. In some embodiments another registered function can be executed to determine the appropriate values. A customer can have the ability through any of these or other mechanisms to remove or reduce the privileges offered for specific events. For example, a script might analyze the data sources needed for an event and then modify the permissions based upon those data sources. The script might also vary the permissions based upon the type of object being processed, such as for a Word document versus a PDF document. In some embodiments the permissions might vary based upon a determined risk level or threat assessment, etc.

Figure 6:
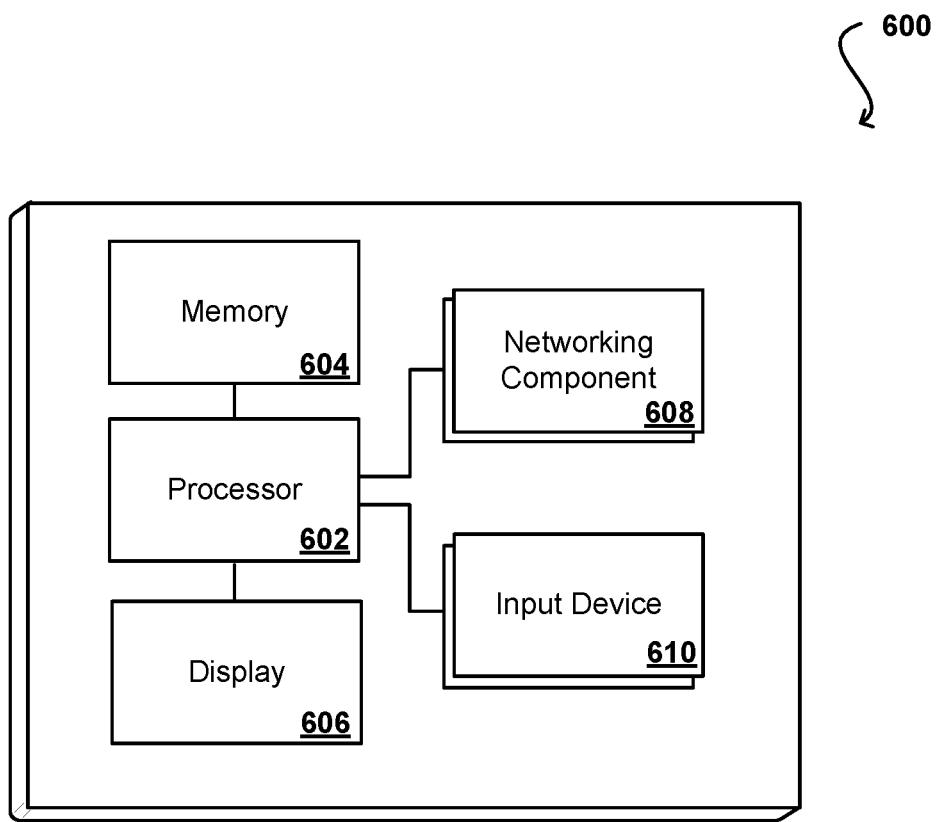
FIG. 6 illustrates example components of a computing device that can be used to implement aspects of the various embodiments.

FIG. 6 illustrates a set of basic components of an example computing device 1000 that can be utilized to implement aspects of the various embodiments. In this example, the device includes at least one processor 602 for executing instructions that can be stored in a memory device or element 604. As would be apparent to one of ordinary skill in the art, the device can include many types of memory, data storage or computer-readable media, such as a first data storage for program instructions for execution by the at least one processor 602, the same or separate storage can be used for images or data, a removable memory can be available for sharing information with other devices, and any number of communication approaches can be available for sharing with other devices. The device may include at least one type of display element 606, such as a touch screen, electronic ink (e-ink), organic light emitting diode (OLED) or liquid crystal display (LCD), although devices such as servers might convey information via other means, such as through a system of lights and data transmissions. The device typically will include one or more networking components 608, such as a port, network interface card, or wireless transceiver that enables communication over at least one network. The device can include at least one input device 610 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or BLUETOOTH® or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or notebook computers running a standard operating system, as well as cellular, wireless and handheld devices running mobile software and capable of supporting a number of networking and messaging protocols. Devices capable of generating events or requests can also include wearable computers (e.g., smart watches or glasses), VR headsets, Internet of Things (IoT) devices, voice command recognition systems, and the like. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   detecting a notification event associated with a customer of a resource provider environment;
   determining a registered function corresponding to the notification event, the registered function including code to be executed on behalf of the customer;
   determining a base credential associated with the registered function, the base credential granting access to a plurality of network resources in the resource provider environment;
   determining a template policy associated with the registered function, the template policy including one or more variables;
   causing values for the one or more variables to be inserted into the template policy to generate an event-specific policy, the values being determined based at least in part upon the notification event, the values specifying a subset of the plurality of network resources to which access is able to be granted;
   sending the event-specific policy to a token service to be used with the base credential to generate an event-specific credential;
   obtaining the event-specific credential from the token service, generated using the event-specific policy and the base credential, the event-specific credential granting a subset of permissions granted by the base credential;
   allocating a resource instance for executing the registered function;
   causing the resource instance to obtain the event information and the event-specific credential;
   causing the resource instance to process the notification event at least in part by executing the registered function using data obtained via the event-specific credential; and
   deleting the event-specific credential after a determined period of time.

2. The computer-implemented method of claim 1, further comprising:
   storing the event-specific credential to a credential cache, wherein the event-specific credential is able to be utilized for processing of similar notification events for the customer during a valid lifetime of the event-specific credential.

3. The computer-implemented method of claim 1, further comprising:
   executing at least one customer-provided script to determine at least one of the values for the one or more variables.

4. The computer-implemented method of claim 1, further comprising:
   receiving the base credential from the token service.

5. The computer-implemented method of claim 1, further comprising:
   receiving the template policy from the customer, enabling the customer to determine which subset of the permissions, granted under the base credential for the customer, are granted by the event-specific credential.

6. The computer-implemented method of claim 1, wherein the resource instance is a virtual machine or a container executing on the virtual machine.

7. A computer-implemented method, comprising:
   detecting an event associated with a registered function;
   determining a template policy associated with the registered function;
   generating an event-specific policy by filling one or more variables of the template policy, associated with the registered function, with values determined based at least in part upon the event, the values specifying a plurality of electronic resources, associated with the registered function, to which access is able to be granted;
   sending the event-specific policy to a token service to be used with the base credential to generate an event-specific credential;
   obtaining the event-specific credential from the token service, generated using the event-specific policy and a base credential, the base credential granting access to the plurality of electronic resources, the event-specific credential granting a subset of permissions granted with respect to the plurality of electronic resources by the base credential, the subset of permissions being relevant to the event;
   allocating a resource instance, of a plurality of resource instances of a resource allocation service, on behalf of the event;
   causing the resource instance to execute the registered function in order to process the event, the resource instance obtaining event data for the event and the event-specific credential for accessing the plurality of electronic resources according to the subset of permissions; and
   deleting the event-specific credential after a determined period of time.

8. The computer-implemented method of claim 7, further comprising:
   storing the event-specific credential to a credential cache, wherein the event-specific credential is able to be utilized for processing of similar notification events for the customer during a valid lifetime of the event-specific credential.

9. The computer-implemented method of claim 7, further comprising:
executing at least one customer-provided script to determine at least one of the values for the one or more variables.

10. The computer-implemented method of claim 7, further comprising:
determining an identity role associated with the registered function; and
binding the identity role to the registered function, wherein the base credential is able to be obtained for the registered function with the permissions granted according to the identity role.

11. The computer-implemented method of claim 7, wherein the plurality of electronic resources are configured as part of a multi-tenant resource environment, the registered function accessible to a plurality of customers of the multi-tenant resource environment, the event-specific credential being allocated for an associated customer of the plurality of customers.

12. The computer-implemented method of claim 7, further comprising:
receiving the base credential from the token service.

13. The computer-implemented method of claim 7, further comprising:
receiving the template policy from the customer, enabling the customer to determine which subset of the permissions, granted under the base credential for the customer, are granted by the event-specific credential.

14. A system, comprising:
at least one processor; and
memory including instructions that, when executed by the at least one processor, cause the system to:
detect an event associated with a registered function;
determine a template policy associated with the registered function;
generate an event-specific policy by filling one or more variables of the template policy, associated with the registered function, with values determined based at least in part upon the event, the values specifying a subset of a plurality of electronic resources, associated with the registered function, to which access is able to be granted;
send the event-specific policy to a token service to be used with the base credential to generate an event-specific credential;
obtain the event-specific credential from the token service, generated using the event-specific policy and a base credential, the base credential granting access to the plurality of electronic resources, the event-specific credential granting a subset of permissions granted with respect to the plurality of electronic resources by the base credential, the subset of permissions being relevant to the event;
allocate a resource instance, of a plurality of resource instances of a resource allocation service, on behalf of the event;
cause the resource instance to execute the registered function in order to process the event, the resource instance obtaining event data for the event and the event-specific credential for accessing the plurality of electronic resources according to the subset of permissions; and
delete the event-specific credential after a determined period of time.

15. The computer-implemented method of claim 14, wherein the instructions when executed further cause the system to:
store the event-specific credential to a credential cache, wherein the event-specific credential is able to be utilized for processing of similar notification events for the customer during a valid lifetime of the event-specific credential.

16. The computer-implemented method of claim 14, wherein the instructions when executed further cause the system to:
execute at least one customer-provided script to determine at least one of the values for the one or more variables.

17. The computer-implemented method of claim 14, wherein the instructions when executed further cause the system to:
receive the base credential from the token service.

18. The computer-implemented method of claim 14, wherein the instructions when executed further cause the system to:
receive the template policy from the customer, enabling the customer to determine which subset of the permissions, granted under the base credential for the customer, are granted by the event-specific credential.

19. The computer-implemented method of claim 14, wherein the instructions when executed further cause the system to:
determine an identity role associated with the registered function; and
bind the identity role to the registered function, wherein the base credential is able to be obtained for the registered function with the permissions granted according to the identity role.

20. The computer-implemented method of claim 14, wherein the plurality of electronic resources are configured as part of a multi-tenant resource environment, the registered function accessible to a plurality of customers of the multi-tenant resource environment, the event-specific credential being allocated for an associated customer of the plurality of customers.

* * * * *